United States Patent
Schumann et al.

(10) Patent No.: US 10,923,710 B2
(45) Date of Patent: Feb. 16, 2021

(54) ELECTRODE MATERIAL FOR A LITHIUM-ION BATTERY

(71) Applicant: Robert Bosch GmbH, Stuttgart (DE)

(72) Inventors: Bernd Schumann, Rutesheim (DE); Christine Engel, Vaihingen/Enz Ensingen (DE); Ingo Kerkamm, Stuttgart-Rohr (DE); Olga Heckel, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 16/329,108

(22) PCT Filed: Jul. 14, 2017

(86) PCT No.: PCT/EP2017/067798
§ 371 (c)(1),
(2) Date: Feb. 27, 2019

(87) PCT Pub. No.: WO2018/041461
PCT Pub. Date: Mar. 8, 2018

(65) Prior Publication Data
US 2020/0185702 A1    Jun. 11, 2020

(30) Foreign Application Priority Data

Aug. 30, 2016  (DE) .................. 10 2016 216 253

(51) Int. Cl.
*H01M 4/00* (2006.01)
*H01M 4/131* (2010.01)
(Continued)

(52) U.S. Cl.
CPC .......... *H01M 4/131* (2013.01); *H01M 4/625* (2013.01); *H01M 10/0525* (2013.01);
(Continued)

(58) Field of Classification Search
CPC ....... H01M 2/1646; H01M 2300/0091; H01M 10/0562; H01M 10/0525
See application file for complete search history.

(56) References Cited

U.S. PATENT DOCUMENTS 8,597,838 B2 * 12/2013 Liang ................. H01M 4/583
429/335
2009/0087660 A1    4/2009 Suzuki et al.
(Continued)

FOREIGN PATENT DOCUMENTS

DE    102016100472    7/2016
EP    2800171 A1    11/2014
WO    0117051    3/2001

OTHER PUBLICATIONS

International Search Report for Application No. PCT/EP2017/067798 dated Jan. 9, 2018 (English Translation, 2 pages).

*Primary Examiner* — Cynthia H Kelly
*Assistant Examiner* — Monique M Wills
(74) *Attorney, Agent, or Firm* — Michael Best & Friedrich LLP

(57) ABSTRACT

The present invention relates to an electrode material for an electrochemical energy accumulator, in particular for a lithium-ion cell, comprising particles (10, 10', 10") of an active material (12) which can be lithiated, wherein the particles (10, 10', 10") are partially coated with a lithium-ion-conducting solid electrolyte (14), the solid electrolyte layer (14) having recesses (16).

15 Claims, 4 Drawing Sheets

(51) Int. Cl.
*H01M 4/62* (2006.01)
*H01M 10/0525* (2010.01)
*H01M 10/0562* (2010.01)

(52) U.S. Cl.
CPC .............. *H01M 10/0562* (2013.01); *H01M 2300/0091* (2013.01); *H01M 2300/0097* (2013.01)

(56) References Cited

U.S. PATENT DOCUMENTS

2016/0156062 A1 6/2016 Littau et al.
2016/0204427 A1 7/2016 Vereecken et al.
2016/0351973 A1* 12/2016 Albano ............. H01M 10/0525

* cited by examiner

1b)

1c)

3b)

3c)

ELECTRODE MATERIAL FOR A LITHIUM-ION BATTERY

BACKGROUND OF THE INVENTION

The present invention relates to an electrode material, an electrode, in particular a cathode, comprising such an electrode material, and also an electrochemical store containing this.

Lithium ion batteries are widespread for many day-to-day applications and are used, for example, in computers, laptops, mobile telephones, smartphones and for other applications. Lithium ion batteries are also the subject of attention for the electrification of motor vehicles which is being promoted strongly at present. Here, the term "battery" is used as a general term for primary batteries and also secondary batteries, also referred to as rechargeable batteries.

Lithium ion cells have a positive electrode, or cathode, and a negative electrode, or anode. These frequently each comprise a power outlet lead to which a positive or negative active material has been applied, which active material "actively" participates in the reversible lithiation or delithiation, i.e. the reversible incorporation and release of lithium ions, during charging and discharging cycles of the battery. Positive and negative electrode are separated by a separator, with charge transport between the electrodes being provided by means of an electrolyte.

In the field of lithium ion batteries, liquid electrolytes, polymer electrolytes and solid electrolyte types are used. Lithium ion batteries comprising solid electrolytes display high energy densities and, due to the absence of organic and sometimes highly flammable liquid electrolytes, display a high degree of safety. The energy density is a measure for the energy storage capability of a cell or a total rechargeable battery system and thus has a direct influence on the achievable range of an electrically powered motor vehicle. The energy density is described as specific energy (Wh/kg) and defines the stored energy content per unit mass. The energy density of solid electrolyte lithium ion batteries can be above 400 Wh/kg.

SUMMARY OF THE INVENTION

The present invention provides an electrode material, for example a cathode material, for an electrochemical energy store, in particular for a lithium ion cell, comprising particles of a lithiatable active material, where the particles are partly coated with a lithium-ion-conducting solid electrolyte and the solid electrolyte layer has recesses, in particular crack-like recesses.

The present invention further provides an electrode, in particular a cathode, comprising such an electrode material, and also an electrochemical energy store, in particular a lithium ion cell, comprising such an electrode.

The recesses, in particular crack-like recesses, in the solid electrolyte layer can, in particular, expose at least part of the surface of the active material. Due to the in particular crack-like recesses in the lithium-ion-conducting solid electrolyte layer, the electrode material allows the provision of electronically conductive paths between the ionically conductively coated surfaces of the particle. This allows the particles of the active material to be ionically and electronically conductively connected. At the same time, contact between the active surface of the active material with a liquid or solid electrolyte between the electrode material is prevented or at least significantly reduced thereby.

For the purposes of the present invention, an active material is a material which participates in a charging or discharging process and thus represents the actually active material of an electrode. A lithiatable active material can be, in particular, a material which can reversibly take up and subsequently release lithium ions during the charging and discharging processes of a battery. For example, the lithiatable active material can be a material which can be intercalated with lithium ions. The uptake or incorporation of a lithium ion into the active material in the simultaneous presence of an electron is also referred to as intercalation, and the release also as deintercalation.

The size or average diameter of the particles of the active material can be in the range from 0.1 µm to 10 µm. In the production of an electrode, e.g. a cathode, it can be advantageous to have a bimodal distribution of the particle size, in particular to use relatively small and relatively large particles together, in order to achieve a very high packing density.

As active material for the positive electrode, namely the cathode, it is possible to use, in particular, lithium-containing transition metal oxides such as lithium-cobalt oxide or lithium-cobalt oxide in which part of the cobalt has been replaced by manganese and/or nickel, or lithium-containing transition metal phosphates. The active material for the positive electrode can have the general formula $LiMO_2$, were M is selected from among Co, Ni, Mn or mixtures thereof and also mixtures of these with Al. In particular, the positive active material can comprise nickel or be a nickel-rich oxide, for example an oxide of the general formula $LiNi_{1-x}M'_xO_2$, where M' is selected from among Co, Mn, Al and mixtures thereof and $0<x<1$. Particular preference is given to compounds in which M' represents a mixture of Co and Al or a mixture of Co and Mn in various ratios. Examples encompass lithium-nickel-cobalt-aluminum oxides such as $LiNi_{0.8}Co_{0.15}Al_{0.05}O_2$ (NCA) and lithium-nickel-manganese-cobalt oxides such as $LiNi_{0.8}Co_{0.1}Mn_{0.1}O_2$ (NCM 8-1-1) or $LiNi_{0.6}Co_{0.2}Mn_{0.2}O_2$ (NCM 6-2-2). Here, the sum of the 10 equivalents corresponds to one metal atom per lithium atom of the formula $LiMO_2$. The active material can also comprise a superlithiated material, known as a high-energy material, of the general formula $n(LiNi_{1-x}M''_xO_2) 1-n(Li_2MnO_3)$, where M'' is a metal ion selected from among Co, Mn and mixtures thereof and $0<n<1$ and $0<x<1$. These materials are referred to as high-energy NCM and display a particularly high specific capacity. In other embodiments, the active material can be an anode material, for example lithium titanate $Li_4Ti_5O_{12}$, lithium metal or a lithium alloy, in particular a lithium-silicon alloy.

The active material particles are partly coated with a lithium-ion-conducting solid electrolyte. The lithium-ion-conducting solid electrolyte comprises, in particular, at least one of the following compounds a) to g):

a) lithium phosphoroxynitride (LiPON) or $Li_3PO_4$ (lithium phosphate);

b) garnets of the general formula $Li_yA_3B_2O_{12}$ having a predominantly cubic crystal structure, where A is at least one element selected from the group consisting of La, K, Mg, Ca, Sr and Ba, B is at least one element selected from the group consisting of Zr, Hf, Nb, Ta, W, In, Sn, Sb, Bi and Te and $3<y<7$. A predominantly cubic crystal structure is in this case a crystal structure which comprises at least 80% by volume of a cubic crystal structure. Particular preference is given to garnets of the formula $Li_yA_3B_2O_{12}$ where A=La and B is selected from among Zr, Nb, Ta and Te. A preferred embodiment is garnets of the general formula $Li_{7-x}La_3Zr_{2-x}M_xO_{12}$ where M is Nb, Ta or a mixture of the two elements and $2 \geq x \geq 0$, in particular $1.5 \geq x \geq 0.5$. A further, preferred embodiment is garnets of the general formula $Li_{7-3z}Al_zLa_3Zr_{2-x}M_xO_{12}$ where M is Nb, Ta or a mixture of the two elements, $2 \geq x \geq 0$, in particular $1.5 \geq x \geq 0.5$, and $0 < z < 0.3$;

c) perovskites of the general formula $Li_{3x}La_{2/3-x}TiO_3$, where $2/3 \geq x \geq 0$, in particular $0.5 \geq x \geq 0.2$. The lithium ion conductivity of these lithium-lanthanum titanates (LLTO) can be about $6 \cdot 10^{-4}$ S/cm at room temperature;

d) compounds of the NASICON type, represented by the general formula $Li_{1+x}R_xM_{2-x}(PO_4)_3$, where M is at least one element selected from the group consisting of Ti, Ge and Hf, R is at least one element selected from the group consisting of Al, B, Sn and Ge and $0 \leq x \leq 2$. In one embodiment, $x=0$. In a preferred embodiment, M=Ti. A preferred embodiment is a compound of the general formula $Li_{1+x}Al_xGe_yTi_{2-x-y}(PO_4)_3$ where $0 \leq x < 2$, $0 \leq y < 2$ and $0 \leq x+y < 2$; with particular preference being given to $0 < x \leq 1$, $0 < y \leq 1$ and $0 < x+y < 2$;

e) lithium-ion-conducting sulfidic glasses of the general formula $x(Li_2S) \cdot y(P_2S_5) \cdot z(M_nS_m)$, where $M_nS_m$ is $SnS_2$, $GeS_2$, $B_2S_3$ or $SIS_2$ and x, y and z can each, independently of one another, assume a value of from 0 to 100, with the proviso that $x+y+z=100$. A preferred embodiment is sulfidic glasses having $60 \geq x \geq 90$, $10 \geq y \geq 60$ and $z=0$. Particular preference is given to $x=70$, $y=30$ and $z=0$. Further preferred embodiments are sulfidic glasses having the composition $x(Li_2S) \cdot y(P_2S_5) \cdot z(GeS_2)$, where $y=z=14$ and $x=72$;

f) argyrodites of the formula $Li_6PS_5X$, where X can be selected from among Cl, Br and I; preferred embodiments are $Li_6PS_5Cl$ and $Li_6PS_5Br$; with particular preference being given to $Li_6PS_5Cl$;

g) polymer electrolytes based on polyethylene oxide (PEO); to increase the lithium ion conductivity, these preferably comprise lithium salts selected from among lithium hexafluorophosphate ($LiPF_6$), lithium tetrafluoroborate ($LiBF_4$), $LiSbF_6$, $LiAsF_6$, $Li(CF_3)SO_2NSO_2(CF_3)$ (LiTFSI), $LiClO_4$, lithium bis(oxalato)borate ($Li[B(C_2O_4)_2]$, LiBOB) and/or lithium difluoro(oxalato)borate ($Li[BF_2(C_2O_4)]$, LiDFOB).

The coating can, particularly in a solid-state cathode, provide the advantages of a high lithium ion conductivity, a high chemical stability toward the active material and good mechanical contact and a low resistance of the phase boundary. A coating of a lithiatable active material particle having, in particular, crack-like recesses provides the further advantage that the coated particle does not tear or burst as a result of the intercalation of lithium ions and the associated expansion of the particle during the charging and discharging cycles of the electrochemical energy store. A coating on the active material particle which has, in particular, crack-like recesses can thus withstand the volume changes in the active material occurring during the charging and discharging processes. Furthermore, coatings having recesses can be applied in a more stress-free manner.

The width of the in particular crack-like recesses can be in the range from a few tens up to a few hundreds of nanometers. One embodiment provides for the width of the recesses, in particular crack-like recesses, in the solid electrolyte layer to be in the range from 10 nm to 800 nm. In other embodiments, the width of the recesses, in particular crack-like recesses, in the solid electrolyte layer can be in the range from 100 nm to 400 nm. For example, the width of the in particular crack-like recesses between two adjacent coated areas can be about 100 nm. Recesses which are in particular crack-like makes it possible to prevent volume changes in the active material during the charging and discharging processes leading to fracture of the coatings, while the gaps between the lithium-ion-conducting coated areas on the surface of the particles are small enough not to decrease the lithium ion conductivity of the active material. It is advantageous that the contact between the solid electrolyte layer and the active material is very good and, in particular, spalling of the layer from the active material is prevented. This likewise leads to a small resistance for the transport of the lithium ions. Crack-like recesses can be produced, for example, by shrinkage during the sintering of an applied solid electrolyte layer.

In a further embodiment, the thickness of the solid electrolyte layer can be in the range from 20 nm to 500 nm. A particular layer thickness of the solid electrolyte layer of, for example, 20 nm is advantageous in order for the electrical resistance for the lithium ions to become as small as possible. At the same time, it is advantageous for the layer thickness not to exceed 500 nm so that the relative proportion of the solid electrolyte layer in the electrode material does not become too great and the energy density of the electrode material remains high. The average diameter of an area coated with solid electrolyte can be in the range from 500 nm to 2 μm.

In a further embodiment, the recesses, in particular crack-like recesses, or the recesses and the solid electrolyte layer can be at least partly covered or coated with an electronically conductive material. The conductivity of the electrode material can be increased in this way. In particular, the electronically conductive material can form a conductive network between the coated particles. It can be provided for at least the in particular crack-like recesses to have an electronically conductive material or be at least partly, preferably completely or essentially completely, filled with the latter. Furthermore, at least the regions of the solid electrolyte layer adjoining the recesses can be covered or coated with the electronically conductive material. The solid electrolyte layer can also be coated with the electronically conductive material in further places. The solid electrolyte layer can also be coated completely or essentially completely with the electronically conductive material. The electronically conductive material can also be enclosed in pores or crevices of the solid electrolyte layer. It can be provided that the active material particles are partly coated with a lithium-ion-conducting solid electrolyte while the remaining surface is in contact with the electronically conductive material.

In a further embodiment, the electronically conductive material is made up of carbon, in particular elemental carbon. This can be selected from among carbon black, graphite or carbon nanotubes. Industrial carbon black is particularly useful. Carbon displays good electronic conductivity and is easy to process. Furthermore, it is advantageous for the electronically conductive material to correspond to a customarily used conductive additive, so that a very resistance-free overall conduction results. The electronically conductive material can be applied by rolling the particles in the material, for example graphite powder or carbon black. The electronically conductive material can likewise be applied by other coating techniques, for example dip coating in an appropriate slurry.

The electronically conductive material can, in various embodiments, be present as a mixture with a lithium-ion-conducting material. For example, it is possible to use a mixture of particles of the electronically conductive material such as carbon black and particles of a lithium-ion-conducting material. In a further embodiment, the recesses or the recesses and the solid electrolyte layer can be at least partly covered or coated with a mixture of an electronically conductive material and a lithium-ion-conducting material. A mixture of an electronically conductive material and a lithium-ion-conducting material can contribute to the coated area of the particle and also the recesses having both electronic and ionic conductivity and being above the percolation threshold. The lithium-ion-conducting material or the particles of the lithium-ion-conducting material can be made up of at least one of the above-described compounds a) to g). Particular preference is given here to lithium-ion-conducting sulfidic glasses and argyrodites of the formula $Li_6PS_5X$. In particular, the particles of the lithium-ion-conducting material can be composed of the same material as the solid electrolyte layer. This can lead to low transition resistances between the individual layers of the particle.

The particles of the lithiatable active material can thus have two layers, with the particles being partly coated with a lithium-ion-conducting solid electrolyte and the remaining recesses being provided with particles of an electronically conductive material such as carbon black or a mixture of electronically conductive and lithium-ion-conducting material or having a layer containing these. This can lead to the structure of the particles of the electrode material having three phase boundaries between active material, ionic conductor and electronic conductor. Furthermore, the proportion of active material can be made very high, as a result of which the energy density can be increased. In this way, it is possible to provide a structure of a solid-state electrode material which comprises active material, lithium ion conductor and electronically conductive additive and can be produced cheaply and allows commercialization of solid-state cells.

The electrode material comprising the particles which are partly coated with a lithium-ion-conducting solid electrolyte, in particular having a coating comprising an electronically conductive material or a mixture of an electronically conductive material and a lithium-ion-conducting material, can be used with or in solid-state, liquid or gel-type electrolytes. An electrode can be produced from the electrode material by conventional methods, for example by producing a slurry and applying this to a power outlet lead, for example by doctor blade coating. The electrode material here can comprise not only the active material or active materials but also further materials, in particular a binder. The particles can be incorporated into the binder or be mixed with the latter. A suitable binder can be selected from the group consisting of natural or synthetic polymers such as polyvinylidene fluoride (PVDF), alginates, styrene-butadiene rubber (SBR), polyethylene glycol and polyethylenimine. When the particles have a coating comprising an electronically conductive material, no further addition of a conductive additive such as carbon black or graphite is necessary, which is advantageous.

The electrode material can particularly advantageously be used for solid-state cells. Solid electrolyte lithium ion batteries can make a particularly good cycling life available. In a further embodiment, the coated particles are embedded in a matrix comprising a lithium-ion-conducting material. In particular, the matrix can comprise a polymer material or a glass-ceramic and a lithium salt. The matrix is preferably composed of an elastic material. The polymer material can be a polymer based on polyethylene oxide (PEO) or be selected from among polyvinylidene fluoride (PVDF), alginates, styrene-butadiene rubber (SBR), polyethylene glycol and polyethylenimine. The glass-ceramic can be a compound of the NASICON type. The lithium salt can be selected from among lithium hexafluorophosphate ($LiPF_6$), lithium tetrafluoroborate ($LiBF_4$), $LiSbF_6$, $LiAsF_6$, $Li(CF_3)SO_2NSO_2(CF_3)$ (LiTFSI), $LiClO_4$, lithium bis(oxalato)borate ($Li[B(C_2O_4)_2]$, LiBOB) and/or lithium difluoro(oxalato)borate ($Li[BF_2(C_2O_4)]$, LiDFOB). The matrix particularly preferably comprises a polymer based on polyethylene oxide (PEO) and LiTFSI. Such an embodiment of the electrode material can be used particularly advantageously for solid-state cells.

In a further embodiment, the coated particles can be embedded in a matrix of a composite material comprising a lithium-ion-conducting material and electronically conductive material. In these embodiments, the matrix can additionally contain an electronically conductive additive. The conductive additive can be composed of carbon, in particular elemental carbon, for example selected from among carbon black, graphite or carbon nanotubes, in particular carbon black. The conductivity of the matrix can be improved further in this way.

The production of such an electrode material can, for example, be carried out by, in a first step, mixing a precursor compound of the solid electrolyte, for example an LLTO precursor, by means of sol-gel synthesis and mixing it with the particulate activate material, followed by drying and calcination. In a subsequent step, a slurry can be produced from the active material particles which have been partly coated with the solid electrolyte, polyethylene oxide (PEO), LiTFSI and carbon black. The slurry of the electrode material can then be applied to a power outlet lead, for example an aluminum foil, and dried.

In particular, the electrode material is a cathode material. In other embodiments, the electrode material can be provided for an anode.

To produce an electrode, the active material can be mixed with further components. At least one conductive additive and/or at least one binder can preferably be added to the active material. As conductive additive, it is possible to use, in particular, carbon compounds such as graphite or conductive carbon black. The binder can be selected from the group consisting of natural or synthetic polymers such as polyvinylidene fluoride (PVDF), alginates, styrene-butadiene rubber (SBR), polyethylene glycol and polyethylenimine.

The present invention further provides an electrode in particular a cathode, comprising at least one electrode material according to the invention. The electrode is, in particular, suitable for a lithium ion cell or lithium ion battery. In embodiments in which the active material is, for example, lithium metal, lithium titanate $Li_4Ti_5O_{12}$ or a lithium alloy, in particular a lithium-silicon alloy, the electrode can also be an anode. An electrode can be produced by conventional methods, for example by producing a slurry of the electrode material and applying this to a power outlet lead, for example by doctor blade coating. The electrode therefore further comprises, in particular, a power outlet lead. As regards the further configuration of the electrode, reference may be made to the above description of the electrode material.

The partial coating of the particles with a lithium-ion-conducting solid electrolyte, where the recesses in the solid electrolyte layer are preferably at least partly coated with an electronically conductive material, can have, particularly in a solid-state cathode, the advantages of a high lithium ion conductivity, a high chemical stability toward the active material and/or good mechanical contact and a low transition resistance to the active material. In this way, the electrode and thus a cell containing it can make available a high ionic and electronic conductivity and a high cycling life.

The present invention further provides an electrochemical energy store, in particular a lithium ion cell, comprising such an electrode, in particular a cathode, where the electrode comprises the electrode material of the invention.

For the purposes of the present invention, an electrochemical energy store can be any battery. In particular, an electrochemical energy store can be not only a primary battery but first and foremost a secondary battery, i.e. a rechargeable battery. A battery here can comprise or be one electrochemical element or a plurality of connected electrochemical elements. For example, an electrochemical energy store can be a lithium-based energy store such as a lithium ion battery.

The electrochemical energy store further comprises, in particular, a counterelectrode, in particular an anode, an electrolyte and also a separator between the electrodes. With regard to the further configuration of the electrochemical energy store, reference may be made to the above description of the electrode material. Such an electrochemical energy store can be used, for example, in electric or hybrid vehicles, in tools such as household or garden tools or in consumer electronics products such as mobile telephones, tablets PCs or notebooks.

In summary, an electrode material as described above makes it possible to prolong the life of a lithium ion cell or battery.

As regards further technical features and advantages of the electrode material of the invention, reference is hereby explicitly made to the above description in connection with the electrode of the invention and the electrochemical energy store, the figures and also the description of the figures, and vice versa.

BRIEF DESCRIPTION OF THE DRAWINGS

Further advantages and advantageous embodiments of the subject matter of the invention are illustrated by the drawings and explained in the following description, with the features described being able to form subject matter of the present invention individually or in any combination, unless the contrary is clear from the context. It should be noted here that the drawings have only descriptive character and are not intended to restrict the invention in any way. The drawings show FIG. 1a) a schematic view of a particle according to a first working example of the electrode material of the invention;

FIG. 2b) an enlargement of a section of FIG. 2a) in sectional view;

FIG. 2c) a schematic view of two further adjacent particles which are coated with an electronically conductive material;

FIG. 3b) an enlargement of a section of FIG. 3a) in sectional view;

FIG. 3c) a schematic view of two further adjacent particles which are coated with an electronically and ionically conductive material;

DETAILED DESCRIPTION

Figure 1A:
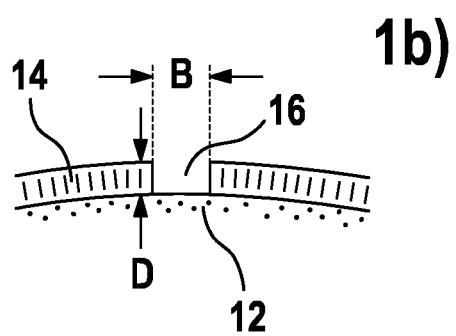
FIG. 1b) an enlargement of a section from FIG. 1a) in sectional view.
FIG. 1c) a schematic view of a further particle according to the first working example of the electrode material of the invention.
Figure 1A:
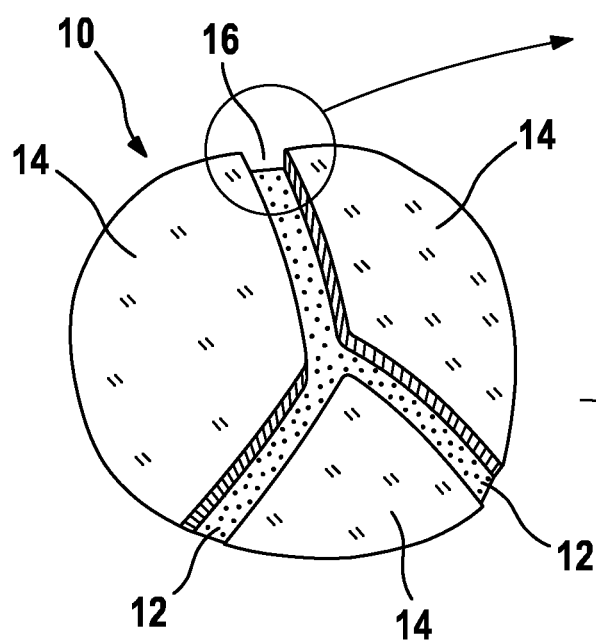
Figure 1A:
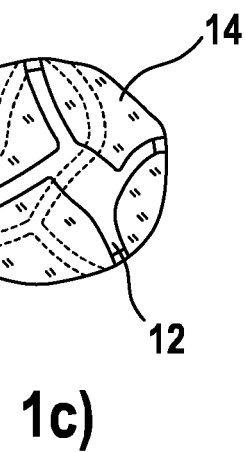

FIG. 1a) depicts a particle 10 composed of a lithiatable active material 12. The active material 12 can be a cathode material, in particular a lithium-containing transition metal oxide such as lithium-cobalt oxide or lithium-cobalt oxide in which part of the cobalt has been replaced by manganese, nickel and/or aluminum. The active material can, in particular, be a lithium-nickel-manganese-cobalt oxide such as $LiNi_{0.8}Co_{0.1}Mn_{0.1}O_2$ (NCM 8-1-1) or $LiNi_{0.6}Co_{0.2}Mn_{0.2}O_2$ (NCM 6-2-2). The particle 10 is partly coated with a lithium-ion-conducting solid electrolyte 14. The lithium-ion-conducting solid electrolyte can be a lithium phosphoroxynitride (LiPON), a garnet of the general formula $Li_yA_3B_2O_{12}$, a perovskite of the general formula $Li_{3x}La_{2/3-x}TiO_3$, a compound of the NASICON type, a lithium-ion-conducting sulfidic glass or an argyrodite of the formula $Li_6PS_5X$. In particular, the lithium-ion-conducting solid electrolyte can be composed of a lithium-lanthanum titanate (LLTO). The solid electrolyte layer 14 has recesses 16. The recesses 16 are, in particular, crack-like.

FIG. 1b) shows an enlargement of a section of FIG. 1a) in sectional view. As is depicted in this view, the width (B) of the recesses 16 can be in the range from 10 nm to 800 nm. For example, the width can be about 100 nm. The thickness (D) of the solid electrolyte layer 14 can be in the range from 20 nm to 500 nm.

FIG. 1c) shows a schematic three-dimensional view of a further particle which is composed of a lithiatable active material 12 and is partly coated with a lithium-ion-conducting solid electrolyte 14. The recesses on the rear side of the particle are indicated by broken lines.

Figure 2A:
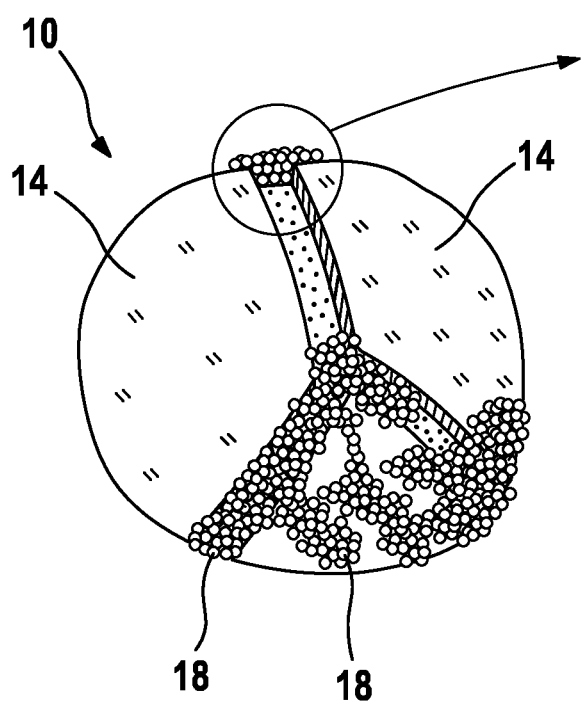
FIG. 2a) a schematic view of a particle partly coated with an electronically conductive material.
Figure 2A:
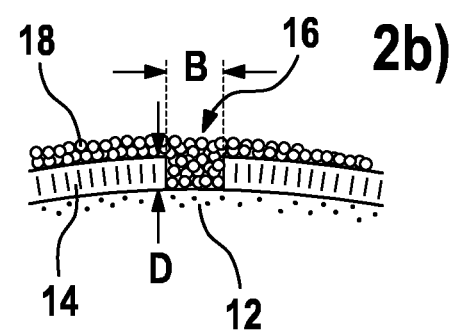
Figure 2A:
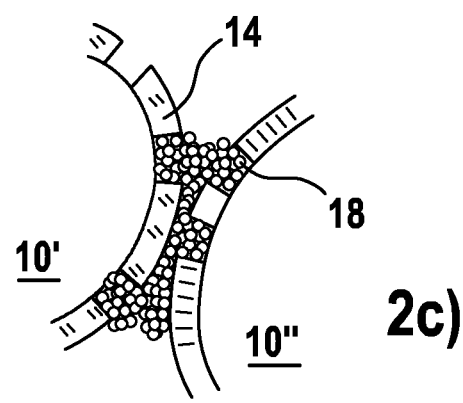

FIG. 2a) depicts a particle 10 which is composed of a lithiatable active material 12 and is partly coated with a lithium-ion-conducting solid electrolyte 14. The solid electrolyte layer 14 has in particular crack-like recesses 16. In this embodiment, the recesses 16 and the solid electrolyte layer 14 are partly coated with an electronically conductive material 18. In particular, the regions of the solid electrolyte layer 14 which adjoin the recesses 16 are covered with the electronically conductive material 18. The electronically conductive material 18 can be composed of carbon, in particular conductive carbon black, graphite or carbon nanotubes. The enlarged sectional view of FIG. 2b) shows that the recess 16 of the solid electrolyte layer 14 is filled with the electronically conductive material 18 while the adjoining surface of the solid electrolyte layer 14 is likewise covered with the electronically conductive material 18. The conductive material can likewise be present in pores or crevices of the solid electrolyte.

FIG. 2c) shows two neighboring particles 10' and 10" which are each covered with an electronically conductive material 18. Here, it is possible, as shown in FIG. 2c), for the volume between the particles 10' and 10" to be filled with the electronically conductive material 18.

Figure 3A:
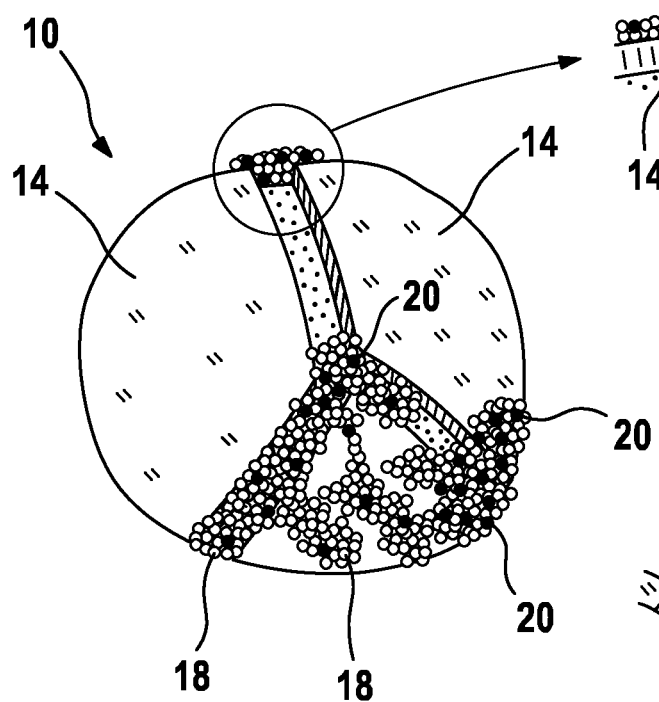
FIG. 3a) a schematic view of a particle partly coated with an electronically and ionically conductive material.
Figure 3A:
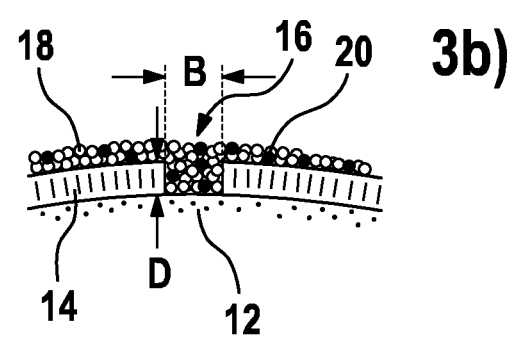
Figure 3A:
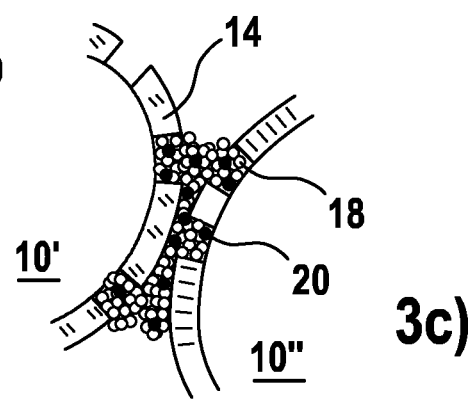

FIG. 3a) depicts a particle 10 which is composed of a lithiatable active material 12 and is partly coated with a lithium-ion-conducting solid electrolyte 14, with the solid electrolyte layer 14 having in particular crack-like recesses 16. The recesses 16 and the solid electrolyte layer 14 are, in this embodiment, partly coated with a mixture of an electronically conductive material 18 and a lithium-ion-conducting material 20. The electronically conductive material 18 can be made up of carbon particles such as carbon black. The lithium-ion-conducting material 20, or the particles of the lithium-ion-conducting material, can be, in particular, composed of lithium-ion-conducting sulfidic glasses or argyrodites of the formula $Li_6PS_5X$. The particles of the lithium-ion-conducting material 20 preferably correspond to the material of the solid electrolyte layer 14.

The enlarged sectional view of FIG. 3b) shows that the recess 16 of the solid electrolyte layer 14 is filled with the particles of the electronically conductive material 18 and the lithium-ion-conducting material 20, while the adjoining surface of the solid electrolyte layer 14 is likewise covered thereby. The electronically conductive and lithium-ion-conducting material can likewise penetrate into pores or crevices of the solid electrolyte 14. FIG. 3c) shows two neighboring particles 10' and 10" which are each covered with electronically conductive material 18 and the lithium-ion-conducting material 20. Here, it is possible, as shown in FIG. 3c), for the volume between the particles 10' and 10" to be filled with the electronically conductive material 18 and the lithium-ion-conducting material 20.

Figure 4:
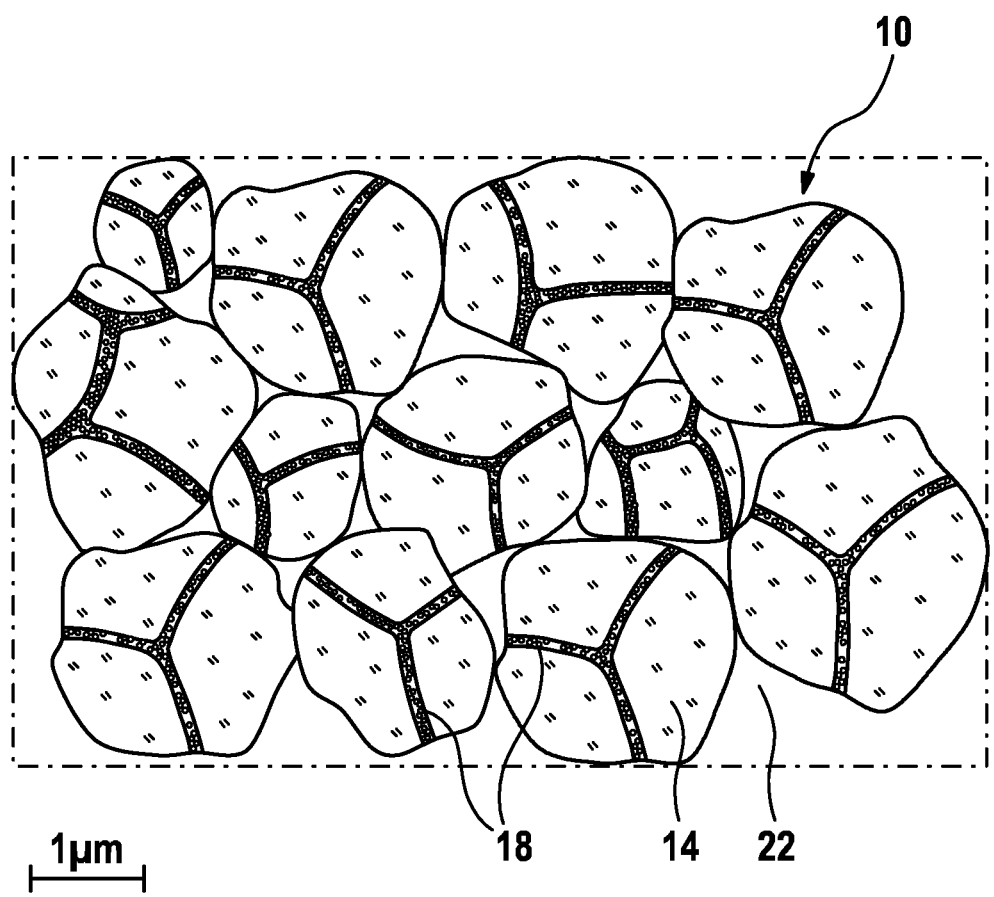
FIG. 4 a schematic view of particles which are embedded in a matrix.

FIG. 4 shows particles 10 which are embedded in a matrix 22 comprising a lithium-ion-conducting material. The particles are coated with a lithium-ion-conducting solid electrolyte 14 and the recesses 16 are filled with an electronically conductive material 18. The particles can have a size of from 0.1 µm to 10 µm, for example from 1 µm to 3 µm. The matrix can comprise a polymer material or a glass-ceramic and a lithium salt. In some embodiments, the matrix 22 can be composed of a polymer based on polyethylene oxide (PEO) containing a lithium salt such as $LiPF_6$, $LiBF_4$, $LiSbF_6$, $LiAsF_6$, LiTFSI, $LiClO_4$, LiBOB or LiDFOB. The matrix 22 particularly preferably comprises PEO and LiTFSI. In other embodiments, the particles can be embedded in a matrix 22 composed of a composite material comprising a lithium-ion-conducting material and an electronically conductive material. In these embodiments, the matrix can additionally contain an electronically conductive additive such as conductive carbon black or graphite, in particular carbon black.

The invention claimed is:

1. An electrode material for an electrochemical energy store, comprising particles of a lithiatable active material, wherein the particles are partly coated with a lithium-ion-conducting solid electrolyte layer, wherein the solid electrolyte layer has recesses.

2. The electrode material as claimed in claim 1, wherein a width (B) of the recesses in the solid electrolyte layer is in the range from 10 nm to 800 nm.

3. The electrode material as claimed in claim 1, wherein a thickness (D) of the solid electrolyte layer is in the range from 20 nm to 500 nm.

4. The electrode material as claimed in claim 1, wherein the recesses or the recesses and the solid electrolyte layer are at least partly covered or coated with an electronically conductive material.

5. The electrode material as claimed in claim 4, wherein the electronically conductive material is composed of carbon.

6. The electrode material as claimed in claim 1, wherein the recesses or the recesses and the solid electrolyte layer are at least partly covered or coated with a mixture of an electronically conductive material and a lithium-ion-conducting material.

7. An anode, comprising at least one electrode material of claim 1.

8. An electrochemical energy store, comprising the anode of claim 7.

9. The electrode material as claimed in claim 4, wherein the electronically conductive material is carbon black, graphite, or carbon nanotubes.

10. A cathode, comprising at least one electrode material of claim 1.

11. A lithium ion cell, comprising the anode of claim 7.

12. An electrode material for an electrochemical energy store, comprising particles of a lithiatable active material, wherein the particles are partly coated with a lithium-ion-conducting solid electrolyte layer, wherein the solid electrolyte layer has recesses, and wherein the coated particles are embedded in a matrix comprising a lithium-ion-conducting material.

13. An electrode material for an electrochemical energy store, comprising particles of a lithiatable active material, wherein the particles are partly coated with a lithium-ion-conducting solid electrolyte layer, wherein the solid electrolyte layer has recesses, and wherein the coated particles are embedded in a matrix composed of a composite material comprising a lithium-ion-conducting material and an electronically conductive material.

14. An electrochemical energy store, comprising the cathode of claim 10.

15. A lithium ion cell, comprising the cathode of claim 10.

* * * * *